United States Patent
Luo et al.

(10) Patent No.: US 9,870,509 B2
(45) Date of Patent: Jan. 16, 2018

(54) IMAGE STORAGE METHOD AND APPARATUS THEREOF

(71) Applicant: HANGZHOU HIKVISION DIGITAL TECHNOLOGY CO., LTD., Hangzhou, Zhejiang (CN)

(72) Inventors: Binghua Luo, Zhejiang (CN); Jiang Zhu, Zhejiang (CN); Shiliang Pu, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 69 days.

(21) Appl. No.: 14/916,893

(22) PCT Filed: Aug. 13, 2014

(86) PCT No.: PCT/CN2014/084294
§ 371 (c)(1),
(2) Date: Mar. 4, 2016

(87) PCT Pub. No.: WO2015/032267
PCT Pub. Date: Mar. 12, 2015

(65) Prior Publication Data
US 2016/0210517 A1    Jul. 21, 2016

(30) Foreign Application Priority Data

Sep. 4, 2013  (CN) .......................... 2013 1 0398902

(51) Int. Cl.
*G06K 9/00* (2006.01)
*H04N 9/79* (2006.01)
(Continued)

(52) U.S. Cl.
CPC ....... *G06K 9/00771* (2013.01); *G06K 9/2054* (2013.01); *H04N 9/79* (2013.01); *G06K 9/00993* (2013.01); *G06K 9/3233* (2013.01)

(58) Field of Classification Search
USPC ........ 382/100, 103, 104–107, 118, 154, 162, 382/168, 173, 181, 199, 209, 219, 224,
(Continued)

(56) References Cited

U.S. PATENT DOCUMENTS

| 8,805,961 | B2 * | 8/2014 | Nakayama ......... H04N 1/00464 707/662 |
| 2008/0074689 | A1 * | 3/2008 | Yamada ............. H04N 1/00413 358/1.13 |

(Continued)

FOREIGN PATENT DOCUMENTS

| CN | 101112099 | 1/2008 |
| CN | 101394531 | 3/2009 |

(Continued)

OTHER PUBLICATIONS

T. Hata et al., "Surveillance System with Object-Aware Video Transcoder," IEEE 7th Workshop on Multimedia Signal Processing, 2005 (4 pages).

(Continued)

*Primary Examiner* — Seyed Azarian
(74) *Attorney, Agent, or Firm* — Hamre, Schumann, Mueller & Larson, P.C.

(57) ABSTRACT

The present invention relates to the field of data storage, and discloses an image storage method and apparatus thereof. In the present invention, the method comprises the following steps: judging if a storage time of a current image reaches a predetermined duration; if the judgment result is yes, then determining a target region containing at least one region of interest in the current image according to the predetermined (Continued)

duration; generating a target region image containing the target region according to the target region, wherein the data size of the target region image is smaller than the data size of the current image; storing the target region image; deleting the current image. With the growth of storage time, redundant information in the image is gradually removed by setting different durations, so that the storage space occupied by the image can be reduced while the information of a region of interest required in various practical applications can be retained, which achieves the purpose of storing critical information in the limited storage space as long as possible.

10 Claims, 4 Drawing Sheets

(51) Int. Cl.
    *G06K 9/20*     (2006.01)
    *H04N 7/18*     (2006.01)
    *G06K 9/32*     (2006.01)

(58) Field of Classification Search
    USPC ......... 382/232, 254, 274.276, 286–291, 305, 382/312, 321; 348/143, 333.11; 707/662; 358/1.13
    See application file for complete search history.

(56) References Cited

U.S. PATENT DOCUMENTS

| | | | | |
|---|---|---|---|---|
| 2009/0009598 | A1* | 1/2009 | Sotodate | H04N 5/76 348/143 |
| 2009/0263021 | A1* | 10/2009 | Takamori | G06K 9/00771 382/181 |
| 2013/0182168 | A1* | 7/2013 | Otani | H04N 5/23216 348/333.11 |

FOREIGN PATENT DOCUMENTS

| | | |
|---|---|---|
| CN | 101674444 | 3/2010 |
| CN | 101783852 | 7/2010 |
| CN | 102164231 | 8/2011 |
| CN | 102413301 | 4/2012 |
| CN | 102801955 | 11/2012 |
| CN | 103020624 | 4/2013 |
| CN | 103051877 | 4/2013 |
| CN | 103258028 | 8/2013 |
| EP | 2211274 | 7/2010 |

OTHER PUBLICATIONS

S. Messelodi et al., "A computer vision system for the detection and classification of vehicles at urban road intersections," Pattern Analysis and Applications, 2005, vol. 8, p. 17-31.
Extended European Search Report for European application No. 14841969.0, dated Jul. 22, 2016 (9 pages).
International Search Report for international application No. PCT/CN2014/084294, dated Nov. 28, 2014 (4 pages, including English translation).

* cited by examiner

IMAGE STORAGE METHOD AND APPARATUS THEREOF

FIELD OF THE INVENTION

The present invention relates to the field of data storage, particularly relates to image storage technology.

BACKGROUND OF THE INVENTION

Security checkpoints refer to a road traffic scene monitoring system for taking pictures of, recording and processing all motor vehicles passing through a checkpoint location, relying on specific places on the road, such as checkpoint locations like toll stations, traffic or security inspection stations etc. Currently, high-definition checkpoint systems play an important role in applications such as security, criminal investigation, fighting against and preventing crimes, and coping with emergencies etc., especially in the application of criminal investigation, it requires seeking clues for criminal detection based on the stored checkpoint images, and this method has become an important technical means of criminal investigation and detection.

Criminal investigation and detection may need to look up history images of three months ago or a longer time ago, which requires security checkpoint images to be preserved for a long time, and preserving a large number of checkpoint images requires a very large storage space as more and more high-definition checkpoints have been constructed nowadays. The problem the high-definition security checkpoint system is currently faced with is: the problem of storing a large number of checkpoint images for a long time.

The Chinese patent application CN201210568309 is the closest technical solution of the present invention, which discloses a method for reducing storage spaces. This invention provides a method for reducing storage spaces of images, which addresses the problem of requiring a large storage space to store image signals in the monitoring system of the prior art.

Its technical solution is: obtaining an image signal by a camera, buffering the image signal and outputting a data signal, compressing the data signal and extracting the image data in GIF (Graphics Interchange Format) or JPG (Joint Photographic Experts Group) format, comparing the latest image data with the last updated image data in a register, if the comparison result exceeds a range, extracting the image data in JPG format, otherwise extracting the image data in GIF format.

The essence of its technical solution is: storing a low-resolution image in a memory when there is no difference from the obtained image, so that storage spaces are reduced. Though this method for reducing storage spaces by way of decreasing image resolutions reduces storage spaces, it also reduces a recognizable degree of critical information, and this loss of the critical information would seriously affect applying security checkpoint images in the criminal investigation.

SUMMARY OF THE INVENTION

The purpose of this invention is to provide an image storage method and apparatus thereof, where redundant or unimportant information in the image is gradually removed by setting different durations, so that the storage space occupied by the image is reduced while the information of a region of interest required in various practical applications is retained.

To solve the above technical problems, the embodiments of the present invention disclose an image storage method which comprises the following steps:

judging if a storage time of a current image reaches a predetermined duration;

if the judgment result is yes, then determining at least one region of interest corresponding to the predetermined duration in the current image as a target region;

generating a target region image containing the target region according to the target region, wherein the data size of the target region image is smaller than the data size of the current image;

storing the target region image;

deleting the current image.

The embodiments of the present invention also disclose an image storage apparatus which comprises the following units:

a judging unit that judges if a storage time of a current image reaches a predetermined duration;

a determining unit that determines at least one region of interest corresponding to the predetermined duration in the current image as a target region, when the judgment result is yes;

a generating unit that generates a target region image containing the target region according to the target region, wherein the data size of the target region image is smaller than the data size of the current image;

a storing unit that stores the target region image;

a deleting unit that deletes the current image.

Comparing the embodiments of this invention with prior arts, the main distinctions and their effects are:

With the growth of storage time of an image, redundant or unimportant information in the image is gradually removed by setting different durations, so that the storage space occupied by the image can be reduced while the information of a region of interest required in various practical applications can be retained. In various security checkpoints, such as vehicle checkpoints and human face checkpoints, utilizing the present invention can reduce a range of a target region gradually over time by extracting an image containing the region of interest, which reduces the image storage and achieves the purpose of storing critical information in the limited storage space as long as possible, thus effectively solving the problem of insufficient storage space for a large number of images and lowering storage costs.

Further, the target region of the image can be gradually reduced by setting a plurality of predetermined durations, which achieves the purpose of gradually reducing the storage space occupied by the image while retaining the region of interest with the growth of storage time.

Further, the recognition and determination is performed for the region of interest after the original image data is collected, so that data operation for determining the region of interest can be omitted in the later process of image storage and storage costs can be saved.

Further, by decreasing the resolution of the non-target region in the image, not only the storage space of the image in the storage medium can be reduced, but also relevant background of the region of interest can be reserved while the region of interest is reserved, maximizing the retention of the information displayed by the image.

DETAILED DESCRIPTION OF THE PREFERRED EMBODIMENTS

In the following description, many technical details are provided for readers to better understand the application. However, it is understood to those skilled in the art that the technical solution claimed to be protected by those claims of this application can also be realized even without these technical details and not based on various changes and modifications of the following embodiments.

For the purpose, technical solution and merits of this invention to be clearer, the following will further describe the embodiments of this invention in detail with reference to the accompanying drawings.

Figure 1:
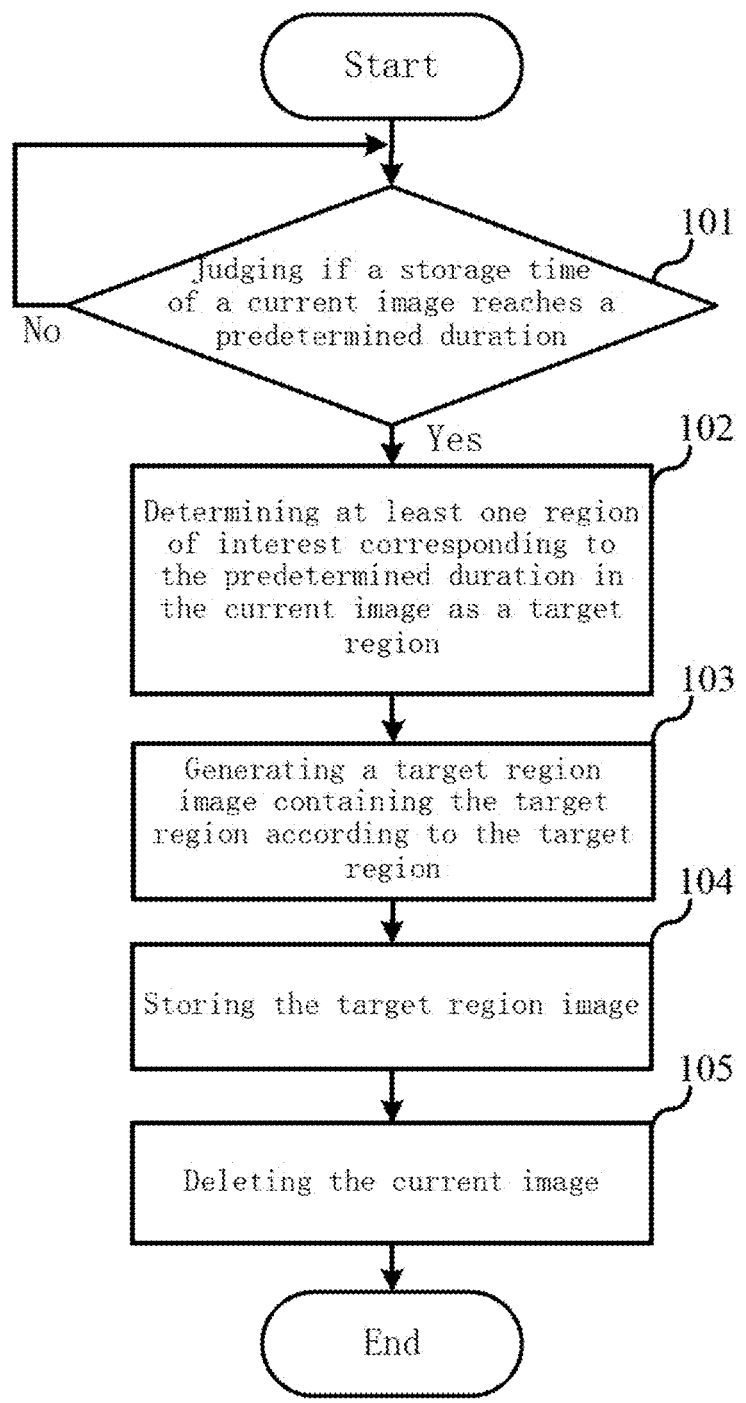
FIG. 1 is a flowchart for an image storage method in the first embodiment of the present invention.

The first embodiment of the present invention relates to an image storage method. FIG. 1 is a flowchart for the image storage method.

Specifically, as shown in FIG. 1, the image storage method comprises the following steps:

In step 101, it is judged if the storage time of a current image reaches a predetermined duration.

If the judgment result is yes, then it proceeds to step 102, if the judgment result is no, then it returns to step 101.

In the present embodiment, it further comprises the following steps prior to step 101:

an original image is formed from the image collected at a checkpoint location by a camera;

a region of interest in the original image is determined via image recognition and detection techniques, and the information representing the region of interest is stored in the original image.

It can be understood that, in the other embodiments of the present invention, the recognition and determination can be performed for the region of interest immediately after the original image data is collected, then the information of the region of interest is stored in the original image, also the recognition and determination can be performed for the region of interest when the image storage is being processed.

The recognition and determination is performed for the region of interest after the original image data is collected, so that data operation for determining the region of interest can be omitted in the later process of image storage and storage costs can be saved.

In step 102, at least one region of interest corresponding to the predetermined duration is determined in the current image as a target region.

In the present embodiment, at least one predetermined duration is set, each predetermined duration corresponds to a different target region, and the longer the predetermined duration, the smaller the target region.

The target region of the image can be gradually reduced by setting a plurality of predetermined durations, which achieves the purpose of gradually reducing the storage space occupied by the image while retaining the region of interest with the growth of storage time.

Preferably, an example of the present embodiment specifically applied in a vehicle checkpoint includes two predetermined durations, wherein, The region of interest corresponding to a first predetermined duration is a whole vehicle body region.

The region of interest corresponding to a second predetermined duration is a vehicle head in the vehicle body region.

Wherein, the second predetermined duration is longer than the first predetermined duration.

It can be understood that the above whole vehicle body region includes a vehicle head, a vehicle window and the vehicle body region behind the vehicle window of a vehicle, and the vehicle head of the above vehicle body region includes a vehicle window, a license plate of a vehicle.

A region of interest may also be other information in the image which is useful for practical applications, such as human head information and human body information in human face checkpoints, or information like a vehicle contour, a color of a vehicle body, a vehicle roof, and a driver and passengers etc. in vehicle checkpoints.

In the other embodiments of the present invention, predetermined durations and regions of interest corresponding to the predetermined durations can be divided according to requirements of practical applications, not limited to the division standard in this example of the present embodiment.

Then it proceeds to step 103, a target region image containing the target region is generated according to the target region, wherein the data size of the target region image is smaller than the data size of the current image.

In the present embodiment, the step 103 further comprises the following substeps:

a target region image only containing the target region is generated.

It can be understood that, in the other embodiments of the present invention, the storage space of the image in the storage medium can also be reduced by decreasing the resolution of the non-target region.

Then it proceeds to step 104, the target region image is stored.

Then it proceeds to step 105, the current image is deleted.

Further, it can be understood that, the current image is maintained unchanged without any processing when the storage time of the current image has not reached the predetermined duration.

With the growth of storage time of an image, redundant or unimportant information in the image is gradually removed by setting different durations, so that the storage space occupied by the image can be reduced while the information of a region of interest required in various practical applications can be retained. In various security checkpoints, such as vehicle checkpoints and human face checkpoints, utilizing the present invention can reduce a range of a target region gradually over time by extracting an image containing the region of interest, which reduces the image storage and achieves the purpose of storing critical information in the limited storage space as long as possible, thus effectively solving the problem of insufficient storage space form large number of images and lowering storage costs.

The second embodiment of the present invention relates to an image storage method. The present embodiment is improved based on the first embodiment, and the main improvement is:

The step 103 of generating a target region image containing the target region according to the target region further comprises the following sub-steps:

the resolution of the target region in the current image is maintained;

the resolution of a portion of the current image exclusive of the target region is decreased.

By decreasing the resolution of the non-target region in the image, not only the storage space of the image in the storage medium can be reduced, but also relevant background of the region of interest can be reserved while the region of interest is reserved, maximizing the retention of the information displayed by the image.

Correlated technical details disclosed in the first embodiment are still effective in the present embodiment and will not be repeated here in order to reduce duplication.

Figure 2:
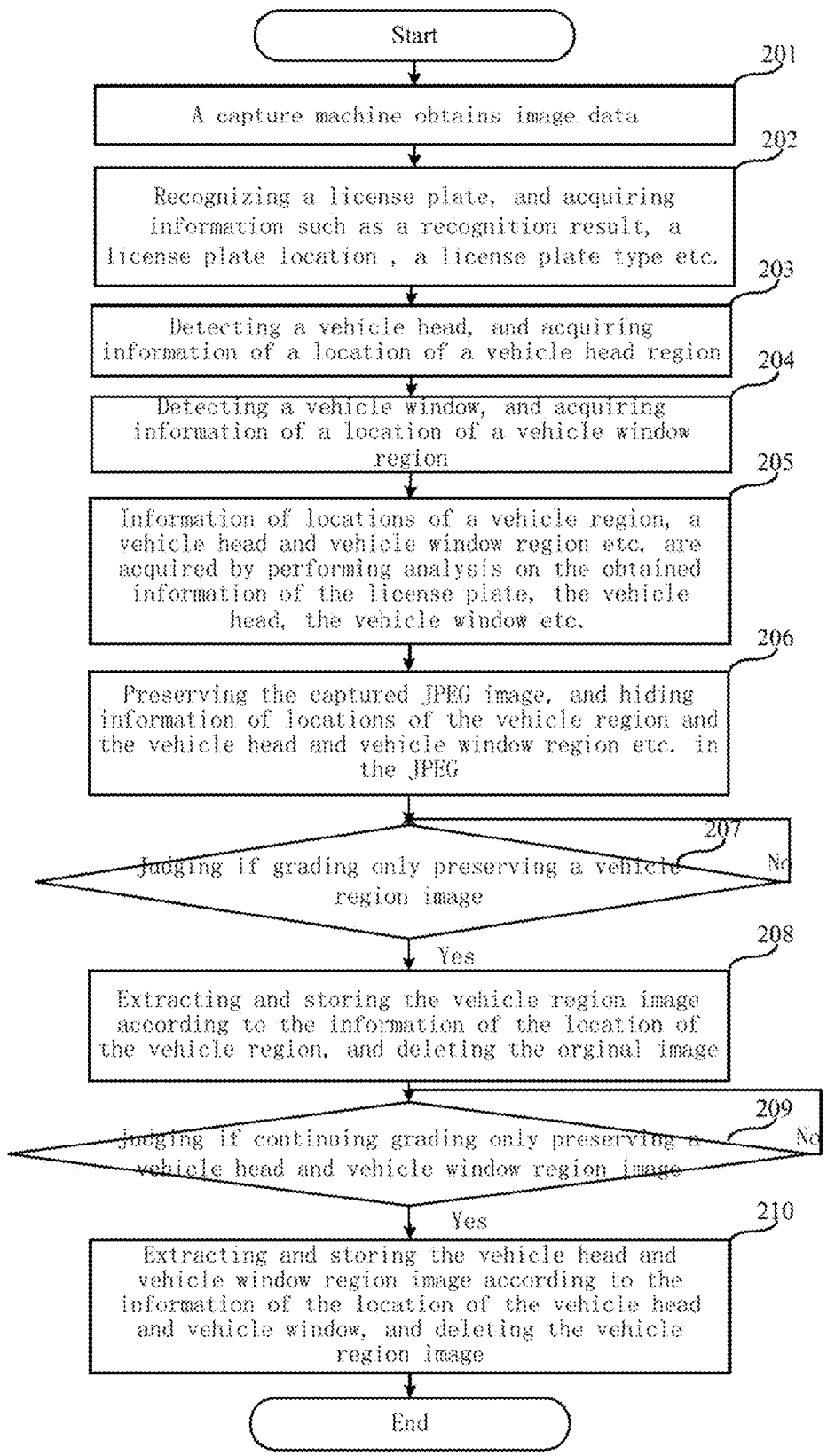
FIG. 2 is a flowchart for an image storage method for vehicle checkpoints in the third embodiment of the present invention.

The third embodiment of the present invention relates to a method of storing images in vehicle checkpoints. FIG. 2 is a flowchart for the method of storing images in vehicle checkpoints.

In the present embodiment, the vehicle critical information region of interest in the criminal investigation is determined via image recognition and detection techniques such as a license plate recognition, a vehicle head detection and a vehicle window detection etc., and images of different regions of interest are graded and stored in terms of different storage periods. Thus, the storage can be reduced by gradually reducing a range of the region of interest, so that the most critical information can be stored for a longer period in the limited storage space and the problem of storing massive security checkpoint images is alleviated.

For example, original images captured in security checkpoints are all deleted after having been stored for three months due to a limitation of storage spaces, and all information are lost. The present embodiment can extract a vehicle region after an image has been stored for three months and only preserve a vehicle region image, then extract a portion of a vehicle window and a vehicle head after the image has been stored for six months and only store a vehicle window and vehicle head region image, which greatly reduces the storage space. Redundant or unimportant information is gradually removed and the stored image region is gradually reduced so as to achieve graded storage and store the most critical vehicle information for a longer period.

Specifically, as shown in FIG. 2, the method of storing images in vehicle checkpoints comprises the following steps:

In step 201, a capture machine obtains image data, and provides the image data to corresponding license plate recognition unit, vehicle head detection unit and vehicle window detection unit (i.e. the units that detect regions of interest) as source data to be processed.

In step 202, a license plate recognition is performed on the image data obtained by the capture machine, and relevant information such as a license plate recognition result, a license plate location, a license plate type etc. is acquired.

In step 203, a vehicle head detection is performed on the image data obtained by the capture machine, and the information such as a vehicle window location etc. is acquired.

In step 204, a vehicle window detection is performed on the image data obtained by the capture machine, and the information such as a vehicle window location etc. is acquired.

Figure 3:
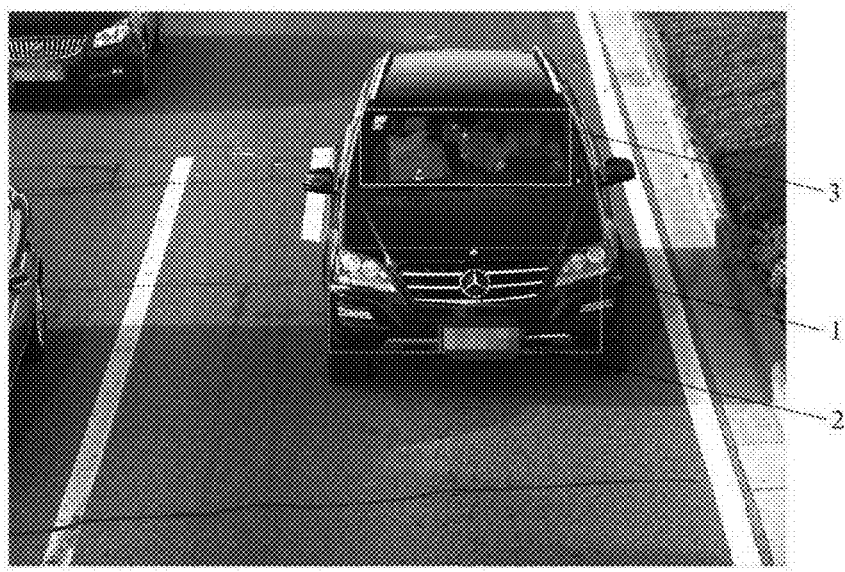
FIGS. 3-5 are schematic diagrams of the target region images generated by an image storage method for vehicle checkpoints in the third embodiment of the present invention.

In step 205, relevant information such as a vehicle region location, a vehicle head location and a vehicle window location etc. are acquired as a basis of extracting an image of the region of interest, by performing an analysis on the obtained relevant information of the license plate, the vehicle head and the vehicle window etc. As shown in FIG. 3, in an image containing the obtained regions of interest, block 1 is a vehicle head region, block 2 within the block 1 is a license plate region, and block 3 is a vehicle window region (the human faces and the license plate in the figure are covered with mosaics in order to avoid unnecessary deputes).

These information can also be obtained when a JPEG image is processed on a backend server.

In step 206, the captured JPEG image is preserved, and relevant information such as the acquired vehicle region location, the acquired vehicle head location and the acquired vehicle window location etc. are hidden in the JPEG image and stored together with the JPEG image.

In step 207, it is judged if the storage time of the image reaches the duration (i.e. first predetermined duration) for grading only preserving a vehicle region (i.e. a target region corresponding to the duration) image, if it is, then it proceeds to step 208, if not, then it continues judgment.

Figure 4:
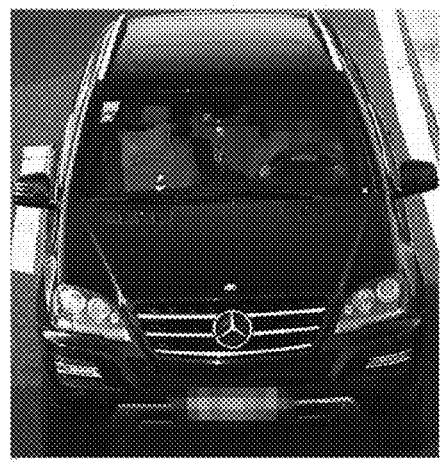

In step 208, the original image is processed after the image has been stored for a certain period (i.e. reaching the first predetermined duration), and the vehicle region image is extracted according to the information of the vehicle region location etc. hidden in the JPEG image, only preserving the vehicle region image and deleting the original image saves the storage space. An example of the extracted vehicle region image is shown as FIG. 4 (the human faces and the license plate in the figure are covered with mosaics in order to avoid unnecessary deputes).

In step 209, it is judged if the storage time of the image reaches the duration (i.e. reaching the second predetermined duration) for grading only preserving a vehicle head and vehicle window region image when the image has been stored for a longer period, if it is, then it proceeds to step 210 if not, then it continues judgment.

Figure 5:
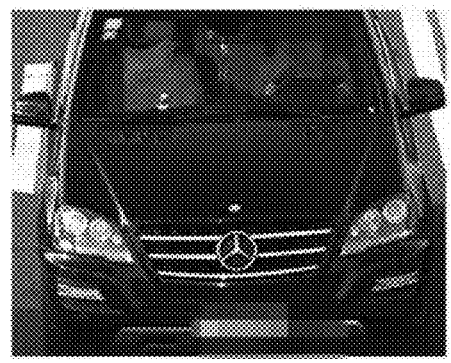

In step 210, the region of interest is further reduced, and the vehicle head and vehicle window region image is extracted according to the information of the vehicle head location and the vehicle window location etc. hidden in the JPEG image, only preserving the vehicle head and vehicle window region image and deleting the vehicle region image further saves the storage space. The extracted vehicle head and vehicle window region image is shown as FIG. 5 (the human faces and the license plate in the figure are covered with mosaics in order to avoid unnecessary deputes).

The present embodiment is not limited to vehicle checkpoints, and is applicable to human face checkpoints for the same, where a human head region corresponds to the above vehicle head and vehicle window region, and a whole human body region corresponds to the above whole vehicle region.

The present embodiment provides a solution for grading and storing a great number of security checkpoint images, which determines the vehicle and human body critical information regions of interest in the criminal investigation via image recognition and detection techniques such as a license plate recognition, a vehicle head detection, a vehicle window detection, a human face detection and a human body detection etc., and grades and stores images of different regions of interest in terms of different storage periods. The present embodiment can extract an image region containing critical information and reduce the storage by gradually reducing a range of the region of interest, so that the most critical information can be stored for a longer period in the limited storage space and the problem of storing massive security checkpoint images is alleviated.

The present embodiment is a specific application of the first embodiment in vehicle checkpoints. Correlated technical details disclosed in the first embodiment are still effective in the present embodiment and will not be repeated here in order to reduce duplication. Correspondingly, correlated technical details disclosed in the present embodiment can also be applied in the first embodiment.

The method embodiments of the present invention all can be realized by software, hardware and firmware etc. Regardless of the present invention is realized by software, or hardware, or firmware, the instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

Figure 6:
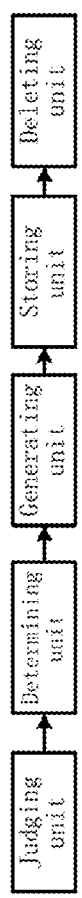
FIG. 6 is a schematic diagram of an image storage apparatus in the fourth embodiment of this invention.

The forth embodiment of the present invention relates to an image storage apparatus. FIG. 6 is a schematic diagram of the image storage apparatus.

Specifically, as shown in FIG. 6, the image storage apparatus comprises the following units:

a judging unit that judges if the storage time of a current image reaches a predetermined duration.

In the present embodiment, at least one predetermined duration is included, each predetermined duration corresponds to a different target region, and the longer the predetermined duration, the smaller the target region.

a determining unit that determines at least one region of interest corresponding to the predetermined duration in the current image as a target region, when the judgment result is yes.

a generating unit that generates a target region image containing the target region according to the target region, wherein the data size of the target region image is smaller than the data size of the current image.

a storing unit that stores the target region image.

a deleting unit that deletes the current image.

In the present embodiment, the apparatus further comprises the following units:

a collecting unit that forms original image data from the image collected at a checkpoint location by a camera;

a region of interest detecting unit that determines a region of interest in the original image via image recognition and detection techniques, and stores the information representing the region of interest in the original image.

Further, it can be understood that, in the other embodiments of the present invention, the recognition and determination can be performed for the region of interest immediately after the original image data is collected, then the information of the region of interest is stored in the original image, also the recognition and determination can be performed for the region of interest when the image storage is being processed.

The recognition and determination is performed for the region of interest after the original image data is collected, so that data operation for determining the region of interest can be omitted in the later process of image storage and storage costs can be saved.

Preferably, in a specific example of the present embodiment applied in a vehicle checkpoint, the apparatus sets two predetermined durations. And the generating unit of the apparatus comprises the following subunits:

a first generating subunit that generates a target region image containing the region of interest corresponding to a first predetermined duration when the storage time reaches the first predetermined duration. The region of interest corresponding to the first predetermined duration is a whole vehicle body region.

a second generating subunit that generates a target region image containing the region of interest corresponding to a second predetermined duration when the storage time reaches the second predetermined duration. The region of interest corresponding to the second predetermined duration is a vehicle head in the vehicle body region.

Wherein, the second predetermined duration is longer than the first predetermined duration.

In the present example, a third predetermined duration can be set in the apparatus, and an image is deleted if the storage time of the image reaches the third predetermined duration.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

Figure 7:
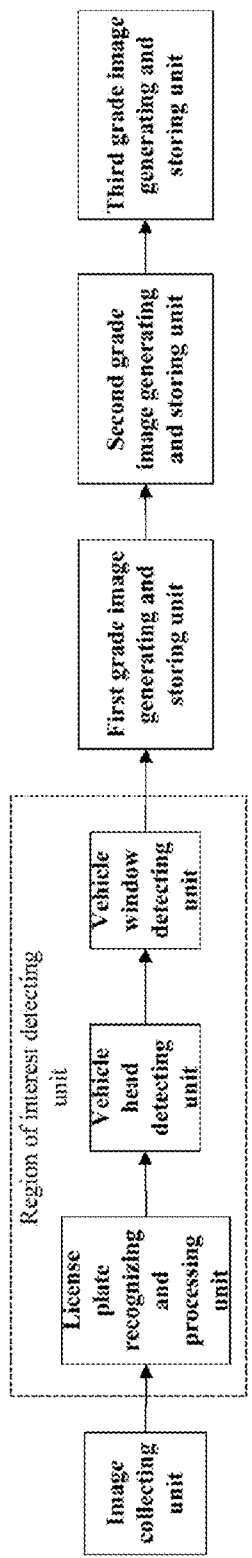
FIG. 7 is a schematic diagram of an image storage apparatus in the fifth embodiment of this invention.

The fifth embodiment of the present invention relates to an image storage apparatus for vehicle checkpoints. FIG. 7 is a schematic diagram of the image storage apparatus.

From the perspective of criminal investigation, critical information in the security checkpoint images mainly includes relevant information of a vehicle, a driver and passengers. The relevant information of a vehicle mainly includes a license plate, a vehicle head (a vehicle light, a cooling fin, a vehicle logo etc.), a color of a vehicle body, a vehicle contour, a vehicle window, a vehicle roof etc.; the relevant information of a driver and passengers mainly includes an appearance of and cloths worn by a personnel in a cab. From the important degree of information, a vehicle head and vehicle window region is the most important region, which mainly includes the most critical information for criminal investigation: a license plate, a vehicle head, a color of a vehicle body, a vehicle window, an appearance of and cloths worn by a personnel in a cab; the next most important region is the vehicle body region behind a vehicle window, which includes the next most critical information: a vehicle contour, a vehicle roof.

In the present embodiment, images are divided into three grades according to different ranges of the stored image regions. A first grade image is the original image captured in a security checkpoint and contains the most abundant information, which simultaneously contains the above most important region of a vehicle head, a vehicle window and the next most important region of the vehicle body region behind a vehicle window, and further contains a background region outside the vehicle; it contains some redundant background region and requires the biggest storage space. A second grade image contains the whole vehicle region, i.e. the above most important region of a vehicle head, a vehicle window and the next most important region of the vehicle body region behind a vehicle window, and it reduces the redundant background region, which greatly reduces the storage space relative to the storage of the first grade image. A third grade image only contains the above most important region of a vehicle head, a vehicle window, and retains the most important critical information relative to the second grade image, further reducing the storage region and the storage space.

Based on the above concept, storage can be graded in terms of different storage periods in the memory media (for example, hard disc). For example, the storage period of the above first grade image region is T1 (for example, six months), the storage period of the above second grade image region is T2 (for example, nine months), and the storage period of the above third grade image is T3 (for example, twelve months). After the above first grade image has been preserved for a time of T1, a second grade image is generated by extracting the second grade image region from the first grade image and stored, the first grade image is deleted, and the second grade image continues being preserved for a time of (T2−T1); after the storage time of the second grade image reaches the storage period, a third grade image is generated by extracting the third grade image region from the second grade image and stored, the second grade image is deleted, and the third grade image continues being preserved for a time of (T3−T2). Thus, originally the first grade image would be completely deleted after having been preserved for a time of T1 due to a limitation of the storage space, but through the technical solution of the present invention, the storage space of the image can be greatly reduced and the critical information can continue being preserved.

Specifically, as shown in FIG. 7, the image storage apparatus mainly comprises five modules, which are image collecting unit, region of interest detecting unit, first grade image generating and storing unit, second grade image generating and storing unit and third grade image generating and storing unit respectively, wherein the region of interest detecting unit is further divided into a license plate recognizing and processing unit, a vehicle head detecting unit, a vehicle window detecting unit.

The image collecting unit forms original image data by collecting an image at a checkpoint location via CCD of a camera.

The region of interest detecting unit determines a critical information region such as a license plate, a vehicle head, a vehicle window etc. via image recognition and target detection techniques. And the region of interest detecting unit mainly comprises a license plate recognizing and processing unit, a vehicle head detecting unit, a vehicle window detecting unit.

Wherein, the license plate recognizing and processing unit performs a processing and a recognition on the received image data, and recognizes the information such as a license plate location of a vehicle etc. in the image.

The vehicle head detecting unit receives the image data collected by the image collecting unit, performs a vehicle head detection on the received image data and determines a vehicle head region.

The vehicle window detecting unit receives the image data collected by the image collecting unit, performs a vehicle window detection on the received image data and determines a vehicle window region.

The first grade image generating and storing unit generates an image from the image data obtained by the image collecting unit, stores the image in an image server, and stores the information representing the detected region of interest in a first grade image.

The second grade image generating and storing unit extracts the image data of a second grade image region from the first grade image according to the information of the region of interest obtained by the detecting unit, generates a second grade image from the extracted image data of a second grade image region and stores the second grade image in the image server, and stores the information representing the region of interest in the second grade image. Meanwhile, the first grade image is deleted.

The third grade image generating and storing unit extracts the image data of a third grade image region from the second grade image according to the information of the region of interest obtained by the detecting unit, generates a third grade image and stores the third grade image in the image server, and stores the information representing the region of interest in the third grade image. Meanwhile, the second grade image is deleted.

A real time mode of the image storage apparatus is shown in FIG. 7:

First, the image collecting unit collects an image and sends the image to the region of interest detecting unit.

Second, the region of interest detecting unit receives the image data collected by the image collecting unit, recognizes and detects a license plate, a vehicle head and a vehicle window, and determines regions of the image in which the license plate, the vehicle head and the vehicle window are located. There is no demand for the sequence of the license plate recognizing and processing unit, the vehicle head detecting unit, the vehicle window detecting unit in the region of interest detecting unit, and it can be performed according to an arbitrary sequence. The vehicle head detecting unit in the region of interest detecting unit can be selectively utilized, if the license plate has been detected, the vehicle head detecting unit may not be utilized because the license plate is within the vehicle head region, if the license plate has not been detected, the vehicle head detecting unit has to be utilized to determine the vehicle head region. The region of interest detecting unit extracts all regions of interest at one time, and does not requires a graded extraction.

Then, the first grade image generating and storing unit generates an image from the image data obtained by the collecting unit, meanwhile also hides the information of the region of interest obtained by the region of interest detecting unit in the generated image, stores a first grade image and completes a first grade storage of the image.

Then, the second grade image generating and storing unit extracts the image data of a second grade image region from the first grade image according to the information of the region of interest hidden in the first grade image and generates an image from the extracted image data of a second grade image region, meanwhile extracts the information of the region of interest hidden in the first grade image and also hides the extracted information of the region of interest in the generated image, stores a second grade image, completes a second grade storage of the image and deletes the first grade image.

Last, the third grade image generating and storing unit extracts the image data of a third grade image region from the second grade image according to the information of the region of interest hidden in the second grade image and generates an image from the extracted image data of a third grade image region, stores a third grade image, completes a third grade storage of the image and deletes the second grade image.

Figure 8:
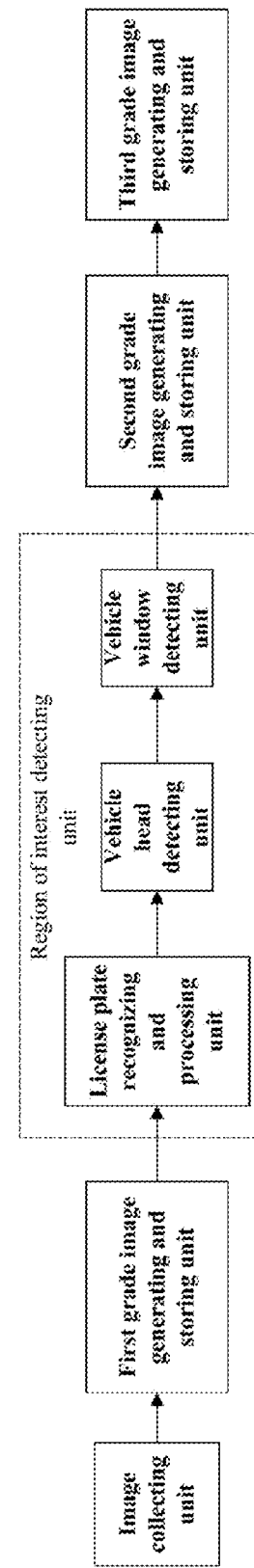
FIG. 8 is a schematic diagram of an image storage apparatus in the sixth embodiment of this invention.

The sixth embodiment of the present invention relates to an image storage apparatus for vehicle checkpoints. FIG. 8 is a schematic diagram of the image storage apparatus.

The present embodiment is improved based on the fifth embodiment, and the deference from the fifth embodiment is: a detection by the region of interest detecting unit is performed based on the first grade image having been stored, and is not a real-time processing, the specific processing of which is not repeated here.

A detection is performed for the region of interest based on the first grade image having been stored, so that the region of interest can be determined according to the current requirement when the second grade image data is extracted, thereby increasing the flexibility and the real-time to determine the region of interest.

In the other embodiments of the present invention, the detection by the region of interest detecting unit can also be performed in real-time when various grades of images are stored according to practical requirements.

It should be noted that units disclosed in each device embodiment of the present invention are logical units, on the physical, a logic unit can be a physical unit, and may be part of a physical unit, or implemented in combination of several physical units, and physical implementing methods for these logic units themselves are not the most important, the combination of the functions achieved by these logic units is the key to solving the technical problem disclosed in the present invention. Furthermore, in order to highlight innovative part of the present invention, the above device embodiments of the present invention do not introduce the units which are not related closely to solving the technical problem disclosed in the present invention, which does not indicate that the above device embodiments do not include other units.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

What is claimed is:

1. An image storage method, wherein, the method comprises the following steps:
   determining by a processor, whether a storage time of a current image in a memory reaches a predetermined duration;
   extracting by the processor, at least one region of interest corresponding to the predetermined duration in the current image as a target region, when the storage time exceeds the predetermined duration;
   reducing by the processor, a storage size of a portion of the current image exclusive of the target region;
   generating by the processor, a target region image containing the target region according to the target region, wherein the data size of the target region image is smaller than the data size of the current image;
   storing the target region image in the memory by the processor;
   and deleting the current image from the memory by the processor;
   wherein it further comprises the following steps prior to the step of determining by the processor, whether the storage time of the current image in the memory reaches the predetermined duration;
   forming by the processor, an original image from the image collected at a checkpoint location by a camera;
   determining by the processor, a region of interest in the original image via image recognition and detection techniques, and storing by the processor, the information representing the region of interest in the original image in the memory.

2. The image storage method according to claim 1, wherein at least one predetermined duration is set by the processor, each predetermined duration corresponds to a different target region, and the longer the predetermined duration, the smaller the target region.

3. The image storage method according to claim 2, wherein the method is utilized for storing images in vehicle checkpoints, and there are two predetermined durations in the method, wherein, a region of interest corresponding to a first predetermined duration is a whole vehicle body region; a region of interest corresponding to a second predetermined duration is a vehicle head in the vehicle body region; the second predetermined duration is longer than the first predetermined duration.

4. The image storage method according to claim 1, wherein the step of generating by the processor, the target region image containing the target region according to the target region comprises the following substep:
   generating by the processor, a target region image only containing the target region.

5. The image storage method according to claim 1, wherein the step of generating by the processor, the target region image containing the target region according to the target region comprises the following substeps:
   maintaining by the processor, the resolution of the target region in the current image;
   decreasing by the processor, the resolution of a portion of the current image exclusive of the target region.

6. An image storage apparatus, comprising:
   a processor and a memory having computer-readable instructions, wherein the processor is configured to
   determine whether a storage time of a current image reaches a predetermined duration in a memory;
   extract at least one region of interest corresponding to the predetermined duration in the current image as a target region, when the storage time exceeds the predetermined duration;
   reduce a storage size of a portion of the current image exclusive of the target region;
   generate a target region image containing the target region according to the target region, wherein the data size of the target region image is smaller than the data size of the current image;
   store the target region image in the memory; and delete the current image from the memory;
   wherein the processor forms original image data from the image collected at a checkpoint location by a camera, and
   determines a region of interest in the original image via image recognition and detection techniques, and stores the information representing the region of interest in the original image in the memory.

7. The image storage apparatus according to claim 6, wherein there is at least one predetermined duration, each predetermined duration corresponds to a different target region, and the longer the predetermined duration, the smaller the target region.

8. The image storage apparatus according to claim 7, wherein the processor stores images in vehicle checkpoints, there are two predetermined durations in the processor, and the
processor generates a target region image containing the region of interest corresponding to a first predetermined duration when the storage time reaches the first predetermined duration,
and generates a target region image containing the region of interest corresponding to a second predetermined duration when the storage time reaches the second predetermined duration;
wherein, the second predetermined duration is longer than the first predetermined duration.

9. The image storage apparatus according to claim 8, wherein, the region of interest corresponding to the first predetermined duration is a whole vehicle body region;
the region of interest corresponding to the second predetermined duration is a vehicle head in the vehicle body region.

10. A computer apparatus, the computer apparatus comprises a non-transitory computer-readable medium having computer-readable instructions that when executed by a processor perform an image storage method, wherein the method comprises the following steps:

determining whether a storage time of a current image in the non-transitory computer-readable medium reaches a predetermined duration;
extracting at least one region of interest corresponding to the predetermined duration in the current image as a target region, when the storage time exceeds the predetermined duration;
reducing a storage size of a portion of the current image exclusive of the target region;
generating a target region image containing the target region according to the target region, wherein the data size of the target region image is smaller than the data size of the current image;
storing the target region image in the non-transitory computer-readable medium;
deleting the current image from the non-transitory computer-readable medium:
wherein it further comprises the following steps prior to the step of determining by the processor, whether the storage time of the current image in the memory reaches the predetermined duration:
forming by the processor, an original image from the image collected at a checkpoint location by a camera;
determining by the processor, a region of interest in the original image via image recognition and detection techniques, and storing by the processor, the information representing the region of interest in the original image in the memory.

* * * * *